April 15, 1952      J. E. NICKELS      2,592,589
PRODUCTION AND SEPARATION OF ISOMERIC ISOPROPYLNAPHTHALENES
Filed July 8, 1948
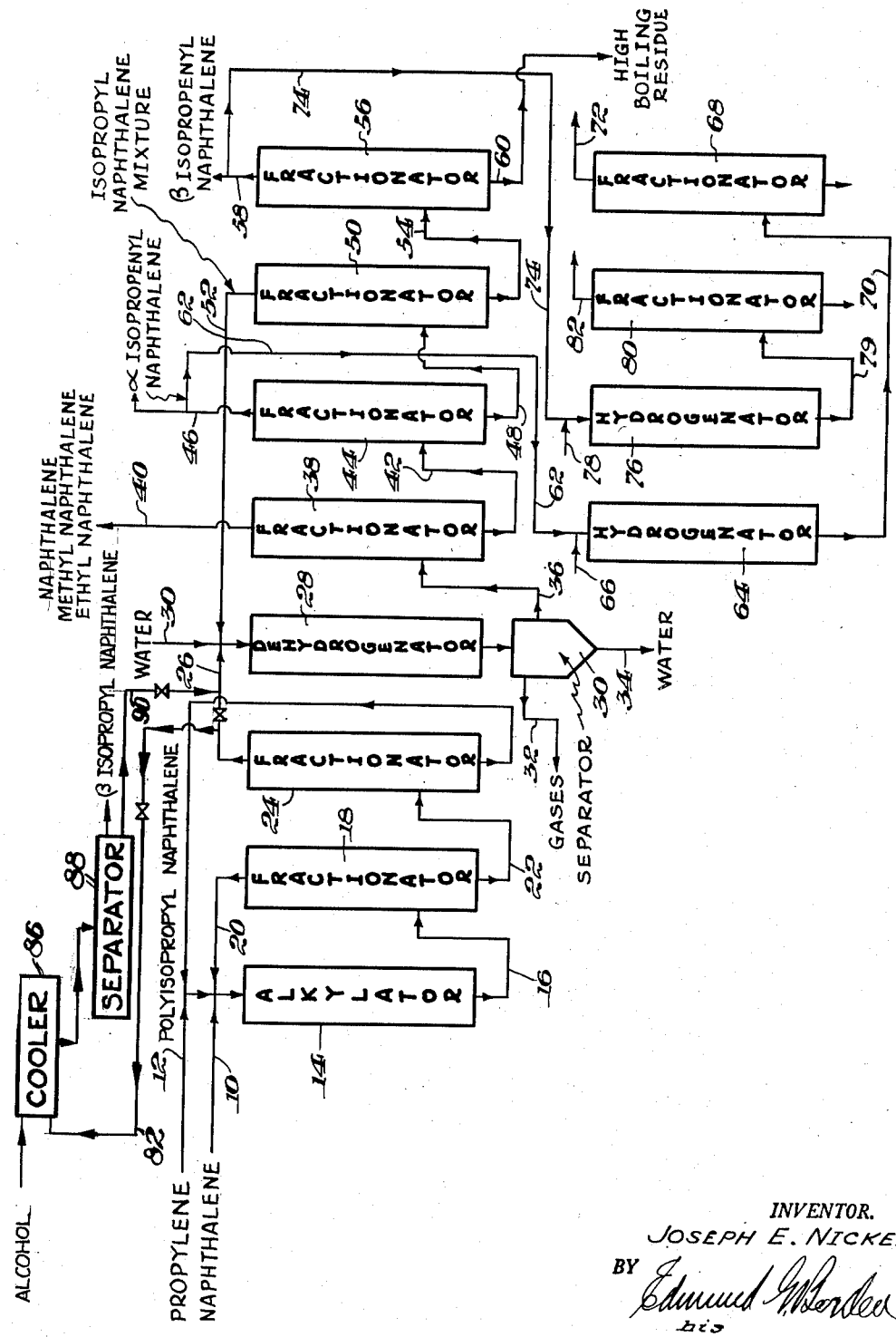
INVENTOR.
JOSEPH E. NICKELS
BY
his ATTORNEY.

Patented Apr. 15, 1952

2,592,589

UNITED STATES PATENT OFFICE 2,592,589

PRODUCTION AND SEPARATION OF ISOMERIC ISOPROPYLNAPHTHALENES

Joseph E. Nickels, Pittsburgh, Pa., assignor to Koppers Company, Inc., Pittsburgh, Pa., a corporation of Delaware Application July 8, 1948, Serial No. 37,549

5 Claims. (Cl. 260—671)

This invention relates to alpha- and beta-isopropylnaphthalenes. More particularly the invention relates to a process of producing pure alpha- and pure beta-isopropylnaphthalenes.

I have found that naphthalene may be alkylated with propylene in liquid phase in the presence of an alumina-silica catalyst at a temperature of 250° C. with a liquid hourly spaced velocity of about 2 and a molar ratio of naphthalene to propylene of 5:1. This temperature may be varied from 150° to 350° C. in accordance with the space velocity and the molar ratio may vary from three to five parts of naphthalene to one part of propylene.

This alkylation produces a mixture of alpha- and beta-isopropylnaphthalenes which naphthalenes have very closely related boiling points and form a eutectic mixture with each other so that it is very hard to separate these two compounds. Further the alpha-isopropylnaphthalene has not been separated from the mixture heretofore because the alpha-isopropylnaphthalene is generally formed in a minor proportion and cannot be separated as such by crystallization or distillation.

The mixture of alpha- and beta-isopropylnaphthalene is a solvent for use in the synthesis of aromatic compounds but the two isomers must be separated to use them as intermediate products in the manufacture of dyestuffs which involve hydroxyalkylation and/or sulphonation.

The primary object of the present invention is to provide a process of separating the mixture of alpha- and beta-isopropylnaphthalene isomers as substantially pure products.

Another object of the invention is to provide a process by which the pure isopropylnaphthalenes may be separated from a eutectic mixture of alpha- and beta-isopropylnaphthalenes.

With these and other objects in view, the invention consists in the process of producing pure alpha- and beta-isopropylnaphthalenes from a mixture of these products.

In the drawing is illustrated a flow sheet of an apparatus in which the preferred form of the invention may be carried out.

Referring to the drawing, naphthalene is introduced through a pipe 10 and propylene is introduced through a pipe 12. The propylene is dissolved in the naphthalene and they pass through an alkylator 14 under sufficient pressure (200 to 900 lbs. per square inch) to maintain the product in the liquid phase. The alkylator is filled with a bed of granular catalyst consisting of an alumina activated silica (1% to 25% alumina and 99% to 75% silica) at a temperature of approximately 250° C. The preferred mixture consists of a molar ratio of naphthalene to propylene of 5:1. This molar ratio may vary from 3 to 10 parts of naphthalene to 1 part of propylene and the temperature may vary from 150° to 350° C. in accordance with the space velocity in the alkylator. At a temperature of 250° C. a space velocity of approximately 2 is maintained. In the alkylator 14 a mixture of alpha- and beta-isopropylnaphthalenes together with unconverted naphthalene are formed and this mixture flows through a line 16 to a fractionating column 18 where it is distilled to pass overhead the unconverted naphthalene. This naphthalene then flows through a line back to the line 12. The alkylated isopropylnaphthalenes pass out of the bottom of fractionator 18 through a line 22 into the mid portion of fractionator 24 where a distillate composed of a mixture of alpha- and beta-isopropylnaphthalene passes overhead through a line 26 into dehydrogenation converter 28. Water or steam is added to the mixture of alpha- and beta-isopropylnaphthalenes through a line 30 and this mixture then passes in the vapor phase through a catalyst bed composed of a granular catalyst which may be a calcined limestone or dolomite, or a ferriferous limestone, or a "1707 catalyst" which is composed of magnesium oxide, iron oxide, copper oxide and $K_2O$, or a zinc catalyst composed of substantially 85% of ZnO, 5% CuO, 5% $K_2O$ and 5% $Fe_2O_3$. It has been found that the 1707 catalyst is very reactive and therefore causes decomposition of the reaction products or the formation of secondary reaction products. The preferred catalyst is the calcined limestone or dolomite.

The vapor phase mixture passing through the converter 28 is maintained at a temperature of 550° to 700° C. and at substantially atmospheric pressure. In the converter 28, the mixture of alpha- and beta-isopropylnaphthalenes is dehydrogenated to a mixture of alpha- and beta-isopropenylnaphthalenes. The reaction products from the converter 28 pass into a separator 30 where gases are removed through a line 32 and water is drawn off at 34. The mixture of alpha- and beta-isopropenylnaphthalenes flows through a line 36 into a fractionator 38 where it is distilled to take overhead naphthalene, methylnaphthalene and ethylnaphthalene, through a line 40. The mixture of alpha- and beta-isopropenylnaphthalenes flows through a line 42 from the still 38 into a fractionating still 44

In the fractionating still 44 alpha-isopropenylnaphthalene is taken overhead through a line 46 and a mixture of beta-isopropenylnaphthalene and isopropylnaphthalenes flows through a line 48 to fractionating still 50. In the fractionating still 50 the isopropylnaphthalenes mixture is taken overhead through a line 52 and passed back to the dehydrogenator 28. The mixture then freed of alpha- and beta-isopropylnaphthalenes is taken through a line 54 to a fractionator 56 where the beta-isopropenylnaphthalene is taken overhead through a line 58 and a higher boiling point residue removed from the bottom of the still through a line 60. The alpha-isopropenylnaphthalene from the line 46 flows through a line 62 to a hydrogenator 64. The hydrogenator is filled with a granular catalyst composed of metallic nickel deposited on a refractory material such as bauxite or pumice, hydrogen being added to the alpha-isopropenylnaphthalene through a line 66. The alpha-isopropenylnaphthalene is hydrogenated at a temperature of 150° C. or less at a pressure of 300 to 2000 lbs. per square inch to produce alpha-isopropylnaphthalene. The alpha-isopropylnaphthalene with other reaction products, then passes to a still 68 through a line 70 where it is fractionated to take overhead a pure alpha-isopropylnaphthalene through a line 72.

The beta-isopropenylnaphthalene from line 58 passes through a line 74 to a hydrogenator 76, hydrogen being introduced into the line 74 through a line 78. The hydrogenation of the beta-isopropenylnaphthalene is carried out at substantially the same temperature and pressure conditions used in the hydrogenation of the alpha-isopropenylnaphthalene. Pure beta-isopropylnaphthalene flows from the hydrogenator 76 through a line 79 into a fractionator 80 and pure beta-isopropylnaphthalene is taken overhead through a line 82.

Substantially pure beta-isopropylnaphthalene may be recovered from the mixture of alpha- and beta-isopropylnaphthalenes coming overhead from the fractionator 24 through the line 26. If it is desired, this mixture may be passed through a line 84 into a dilution and refrigeration tank 86 where it is diluted with an equal volume of methyl alcohol and then cooled to a temperature of about −35° to −40° C. to crystallize a substantially pure beta-isopropylnaphthalene. The crystallized beta-isopropyl naphthalene and mother liquor may then be removed from the cooler 86 and passed into a separator 88 to separate the mother liquor from the crystallized beta-isopropyl naphthalene. The separation may be effected by any means customarily employed in separating crystals from mother liquor in a crystallization process. The mother liquor separated may then flow through a line 90 back to the line 26 and into the dehydrogenator 28 for further treatment. A substantial amount of beta-isopropyl naphthalene will be present with the alpha-isopropyl naphthalene and these two products in purified form will be separated in the apparatus as described above.

In place of methanol which is the low boiling solvent to be used in the crystallization separation of beta-isopropylnaphthalene, petroleum ethers and paraffin hydrocarbons containing 3 to 7 carbon atoms may be used.

By the above process pure alpha- and beta-isopropylnaphthalenes may be obtained which are very useful as intermediate products in the manufacture of dyes. Furthermore the alpha- and beta-isopropenylnaphthalenes are very reactive for making other products. The beta-isopropyl naphthalene may be used in making a product which has the activity of Vitamin K.

By the process outlined above the alkylation of naphthalene with propylene using an alumina-silica catalyst under the preferred temperature conditions will give a yield of approximately 85% mixture of alpha- and beta-isopropylnaphthalenes composed of approximately 14.7% alpha-isomers and 85.3% of beta-isomer. When this mixture of isomers is dehydrogenated with a "1707 Catalyst" the data found in Table I was obtained:

Table I
ISOPROPYLNAPHTHALENE DEHYDROGENATION

| | "1707" | "1707" |
|---|---|---|
| Experimental Conditions: | | |
| Catalyst used | | |
| H₂O:HC ratio, moles | 15:1 | 15:1 |
| Contact time, sec | 0.50 | 0.51 |
| Catalyst temp., ° C | 650 | 600 |
| Length of run, hrs | 60 | 64 |
| Product Distribution, weight per cent: | | |
| Gases | 6.2 | 2.5 |
| Naphthalene | 4.4 | 0.8 |
| Methylnaphthalenes | 0.7 | 0.5 |
| Ethylnaphthalenes | 1.6 | 1.1 |
| Vinylnaphthalenes | 3.8 | 2.7 |
| Isopropylnaphthalenes | 35.3 | 60.7 |
| Isopropenylnaphthalenes | 37.9 | 27.1 |
| Residue | 2.4 | 0.5 |
| Carbon (as CO₂ and CO + carbon deposited on catalyst) | 7.7 | 4.1 |
| Composition of Gases, vol. per cent: | | |
| Hydrogen | 94.0 | 97.9 |
| Ethylene | 1.3 | 0.7 |
| Paraffins | 4.7 | 1.4 |
| Paraffin index | 1.3 | 1.3 |
| Isopropenylnaphthalene Yields, weight per cent: | | |
| Ultimate | 58.6 | 69.0 |
| Per pass | 37.9 | 27.1 |

The isopropylnaphthalenes from the run at 600° C. was fractionated to give a cut below 150° C. composed of naphthalene, methyl-naphthalene and ethyl-naphthalene. The next cut from 150° to 162° C. is composed of alpha-isopropenylnaphthalene, the fractionation being carried out at 50 mm. of mercury in a 23 plate column; the cut from 162° to 168° C. was composed of alpha- and beta-isopropylnaphthalenes; and the cut from 168° to 180° C. was composed of beta-isopropenylnaphthalene. The material boiling above 180° C. was discarded as residue. The dehydrogenation at 600° C. gave approximately 10% yield of alpha-isopropenylnaphthalene. On the other hand when using lime or dolomite, a yield of a mixture of alpha- and beta-isopropenylnaphthalenes of about 80% is obtained of which alpha-isopropenylnaphthalene is approximately 12%, the remainder being beta-isopropenylnaphthalene. When these isopropenyl isomers are hydrogenated a substantial 100% recovery of pure alpha- and beta-isopropylnaphthalenes can be obtained.

The preferred form of the invention having been thus described, what is claimed as new is:

1. A process of producing substantially pure alpha- and beta-isopropyl naphthalenes from a mixture thereof such as is obtained by: alkylating naphthalene under high pressure in the presence of an excess of propylene in liquid phase at a temperature of 150° to 300° C. in the presence of an activated alumina-silica catalyst comprising: dehydrogenating the mixture of alpha- and beta-isopropyl naphthalenes non-destructively to produce a mixture of alpha- and beta-isopropenyl naphthalenes, distilling the mixture to separate alpha- and beta-isopropenyl naphthalenes and separately hydrogenating the alpha- and beta-isopropenyl naphthalenes to recover respectively alpha- and beta-isopropyl naphthalenes, and purifying the alpha- and beta-isopropyl naphthalene products separately by distillation 2. The process defined in claim 1 in which the dehydrogenation mixture is distilled to separate alpha-isopropenylnaphthalene, beta-isopropenylnaphthalene and a mixture of alpha- and beta-isopropylnaphthalenes, and the mixture of alpha- and beta-isopropylnaphthalenes recycled for dehydrogenation with the alkylation reaction products.

3. A process of producing pure alpha- and beta-isopropyl naphthalenes from a mixture thereof such as is obtained by alkylating naphthalene under high pressure with propylene in liquid phase at a temperature of 150° to 300° C. in the presence of an activated alumina-silica catalyst in which the beta-isopropyl naphthalene content is greater than 80%, comprising: diluting the mixture with an equal volume of a low boiling solvent, cooling the mixture to a temperature of −35° to −45° C. to crystallize beta-isopropyl naphthalene, separating the crystallized beta-isopropyl napthalene from the mother liquor, dehydrogenating the mother liquor non-destructively to form alpha-isopropenyl naphthalene, distilling the dehydrogenation product to recover alpha-isopropenyl naphthalene, hydrogenating the alpha-isopropenyl naphthalene under super-atmospheric pressure to produce alpha-isopropyl naphthalene, and distilling the hydrogenation product to recover a purified alpha-isopropyl naphthalene.

4. The process defined in claim 3 in which the low boiling solvent is a solvent of the group consisting of methanol, petroleum ether and paraffin hydrocarbons having 3 to 7 carbon atoms.

5. A process of producing a mixture of alpha- and beta-isopropylnaphthalenes in which the beta-isopropylnaphthalene constitutes from 80% to 85% of the mixture, comprising: dissolving one part of propylene in 3 to 10 parts of naphthalene and alkylating the naphthalene with the propylene under sufficient pressure to maintain the products in liquid phase (300 to 900 lbs. per square inch) at a temperature of approximately 250° C. in the presence of an activated silica-alumina catalyst.

JOSEPH E. NICKELS.

REFERENCES CITED

The following references are of record in the file of this patent:

UNITED STATES PATENTS

| Number | Name | Date |
|---|---|---|
| 2,163,581 | Boyd, Jr. | June 27, 1939 |
| 2,416,990 | Gorin et al. | Mar. 4, 1947 |
| 2,424,841 | Nickels | July 29, 1947 |
| 2,441,095 | Cheney et al. | May 4, 1948 |
| 2,444,035 | Corson et al. | June 29, 1948 |

FOREIGN PATENTS

| Number | Country | Date |
|---|---|---|
| 132,042 | Austria | Sept. 15, 1932 |

OTHER REFERENCES

Slanina et al., "Organic Reactions with Boron Fluoride," J. A. C. S., vol. 57, pages 1547–9 (September, 1935) 3 pages.

Zelinsky et al., "Aromatization by Catalysis," Ind. Eng. Chem., vol. 27, pages 1209–11 (October, 1935), 3 pages.

Berichte, vol. 46, page 535 (1913), 1 page only.

Egloff, "Physical Constants of Hydrocarbons," vol. IV, pages 98, 99, 126, 127 (1947).